United States Patent
Uebbing

(10) Patent No.: US 7,112,157 B2
(45) Date of Patent: Sep. 26, 2006

(54) GEAR UNIT FOR THE DRIVE OF A ROTATION TUBE

(75) Inventor: Dietmar Uebbing, Bocholt (DE)

(73) Assignee: A. Friedr. Flender Aktiengesellschaft, (DE)

( * ) Notice: Subject to any disclaimer, the term of this patent is extended or adjusted under 35 U.S.C. 154(b) by 25 days.

(21) Appl. No.: 10/854,901

(22) Filed: May 27, 2004

(65) Prior Publication Data

US 2004/0242365 A1 Dec. 2, 2004

(30) Foreign Application Priority Data

May 27, 2003 (DE) ................................ 103 24 362

(51) Int. Cl.
*F16H 37/06* (2006.01)
(52) U.S. Cl. ........................ 475/330; 475/302; 475/329
(58) Field of Classification Search ................ 475/330, 475/329, 290, 302, 317, 218, 219, 248, 249, 475/269
See application file for complete search history.

(56) References Cited

U.S. PATENT DOCUMENTS

| | | | | |
|---|---|---|---|---|
| 3,675,508 A | * | 7/1972 | Blank ........................... | 74/745 |
| 3,939,736 A | | 2/1976 | Morin | |
| 3,943,780 A | * | 3/1976 | Klaue ......................... | 475/317 |
| 4,961,485 A | * | 10/1990 | Huff et al. ............... | 192/221.1 |
| 5,240,462 A | * | 8/1993 | Mochizuki et al. ......... | 475/342 |
| 6,000,852 A | * | 12/1999 | Koenig ....................... | 384/282 |
| 6,176,804 B1 | * | 1/2001 | Kekki et al. ................ | 475/331 |
| 6,371,881 B1 | * | 4/2002 | Garcia Benitez et al. ... | 475/269 |
| 6,607,464 B1 | | 8/2003 | Bauer et al. | |

FOREIGN PATENT DOCUMENTS

| | | |
|---|---|---|
| DE | 1 198 637 | 8/1965 |
| DE | 1 206 254 | 6/1966 |
| DE | 1 921 479 | 11/1970 |
| DE | 27 23 319 | 11/1978 |
| DE | 28 41 330 | 3/1980 |
| DE | 35 34 940 | 5/1985 |
| DE | 34 18 543 | 9/1985 |
| DE | 295 101 | 10/1991 |
| DE | 92 18 208 | 11/1993 |
| GB | 2 117 485 | 10/1983 |
| WO | WO 150038 A1 * | 7/2001 |

* cited by examiner

*Primary Examiner*—Rodney H. Bonck
*Assistant Examiner*—David D. Le
(74) *Attorney, Agent, or Firm*—Robert W Becker & Associates; Robert W Becker

(57) ABSTRACT

A gear unit for the drive of a rotating tube is provided with a drive shaft and a power distributing gear unit stage that is configured as a helical gear unit with an intermediate shaft having mounted thereon two helical pinions. A load-summing gear unit stage with a take-off shaft is operated downstream of the gear unit stage. In this connection, the take-off shaft is on the central axis of the driven rotating tube. The load-summing gear unit stage is comprised of two parallel operated planetary gear units each having a sun gear, planetary gears each disposed on a respective planetary axle, a hollow gear and a common planet carrier that is configured as a single piece and connected with the take-off shaft. The planetary axles of both planetary gear units in the common planet carrier are spaced from one another and offset from one another. The intermediate shaft of the helical gear unit and the planetary gear units are supported in floating bearing arrangement, whereby the helical gear unit and the planetary gear units form a symmetrical planetary gear unit combination.

17 Claims, 3 Drawing Sheets

GEAR UNIT FOR THE DRIVE OF A ROTATION TUBE

BACKGROUND OF THE INVENTION

The invention relates to a gear unit for the drive of a rotation tube.

Drive solutions for rotating tubes, such as tube mills or rotary kilns, are characterized along the drive trains thereof by the characteristic configuration beginning with a motor, a coupling, a step-down or speed reducing teeth gear unit, and the thereto coupled tube mill. The gear unit converts the torque of the drive source, which is most typically configured as an electric motor, and, additionally, modulates the output via setting of the speed transmission ratio to that required to achieve the desired output rate of rotation, which is often dictated by the material to be milled by the tube mill.

DE 27 23 319 A1 discloses a two-step multi-path cylindrical gear transmission via which, by means of an inner power distribution, a central drive for tube mills, material size reducers, and similar rotating tubes is created. The distribution of power makes possible an increase of the transferable power output with limited space usage. The power transfer is effected exclusively by hardened outer teeth. The motor-side driving pinion and the intermediate shafts are supported at multiple locations by bearings, whereby this arrangement is associated with an increased production-and installation-effort. This central drive is characterized by the multiplicity of necessary individual measures needed to compensate for the errors caused by production and gear tooth factors.

DE 34 18 543 C1 describes a two-way gear transmission with a distribution of power, by which the distribution of power is effected by an axially freely adjustable shaft on which is mounted oppositely disposed inclined tooth helical pinions. The combined application of the power outputs onto a helical gear having an outer tooth set is effected by the interposition of additional intermediate stages. For the operation of the gear unit of this type, the upper limit of the transferable power outputs is reached at approximately 3000 kW. Higher power outputs can only be achieved with an enlargement of the diameter of the take-off stage. However, with regard to this possibility, which can on principle be considered, it has not been taken into account that the production technical restrictions and the therewith-associated economic arguments work against this approach.

DE 35 34 940 C2 describes an alternative concept that builds upon the principle of power output branching for the drive of tube mills. In this arrangement, the drive stage is a planetary gear and the take-off stage is a cylindrical gear unit. An outer teeth set on the tube mill replaces the gear of the take-off stage of the two-way gear unit disclosed in DE 34 18 543 C1. By reason of the opening of the housing, a requirement in implementing this concept, there is, as a result of the raw environmental influences and the therewith associated wear of the drive components, an increased need for maintenance efforts and efforts to keep the unit ready for operation.

DE 28 41 330 B2 discloses a planetary gear unit with an output branching to two planetary paths with a common planet carrier. The planetary gear unit combines, at the take-off, the previously segregated output streams. The co-axially guided sun shafts are supported at pre-determined locations via roller bearings in the gear unit housing. The other components of the drive chain, hollow gears, planetary gears, and planet carriers are, in any event, supported on bearings at pre-determined locations or, respectively, fixedly mounted relative to the housing. A relative rotation of the sun shafts to one another is not provided. By reason of this guidance of the shafts, in order to compensate for radial and torque disturbances, special configuration measures must be undertaken to compensate for such loads. The torque loading compensation is effected by means of an input-side power distributing coupling.

In operations in the upper output region, planetary gear units are utilized, in connection with which multiple planetary stages are serially performed. Also, it must be taken into account in this connection that the maximum external dimensions considerably increase with an increase of the power output to be transferred. The requirement to produce a pre-determined given transmission ratio from the operational process militates against the deployment of symmetrical coupling linkages.

The invention provides a solution to the challenge of configuring a gear unit of the afore-mentioned type such that the requirements for a low maintenance central drive for rotating tubes such as tube mills or rotary kilns which exhibits a compact configuration, and the requirements for the respective individually required transmission ratio, or speed step-up1 through a simple construction configuration with suitably adapted components, preferably for the upper power output range of more than 3000 kW, can be fulfilled.

The inventive gear unit is characterized by the use of a multiple stage helical gear unit on the input side which effects power distribution and a planetary gear unit on the take-off for load-summing stages, the planetary gear unit being comprised of two planetary stages steps operated in parallel to one another. The gear unit is mounted in a multiple-piece, closed gear unit housing which exhibits a very compact configuration. The planetary stages transmit the mechanical output via a common single piece planet carrier to the working machine. The advantageous configuration of the planet carrier leads, as well, in connection with high power outputs to be transferred, to a compact construction with suitable fitness strength whose production via casting or reforming processes and the thereon following finish machining with simple presentable finish tolerances at a high level of quality is ensured.

BRIEF DESCRIPTION OF THE DRAWINGS

The invention and the advantages associated with the invention are described in more detail hereinafter in connection with an embodiment illustrated in the drawings, in which.

DESCRIPTION OF SPECIFIC EMBODIMENTS

Figure 1:
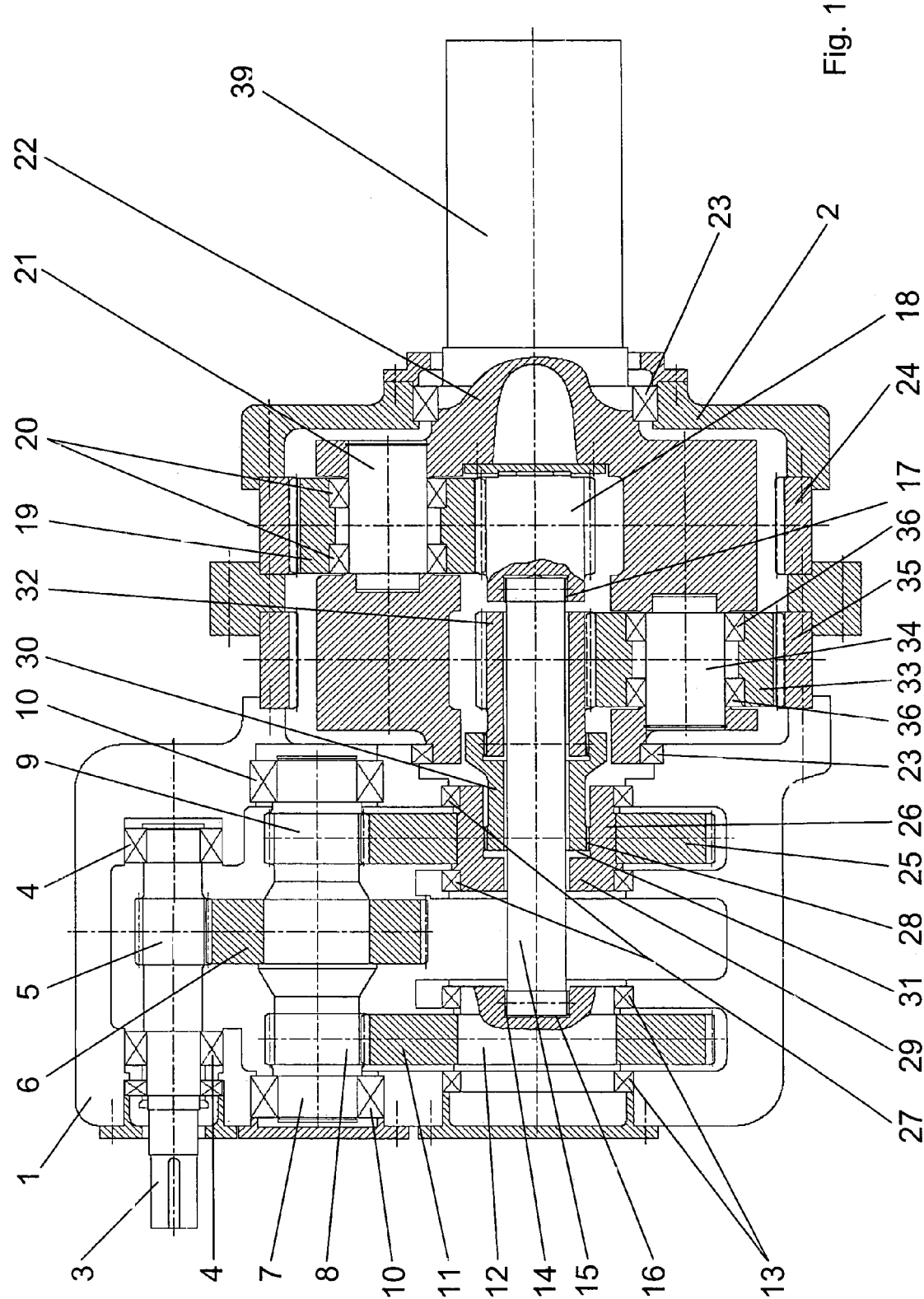
FIG. 1 shows a longitudinal view through a gear unit.

The gear unit shown in FIG. 1 serves as the drive of a tube mill with a straight line flow or stream of the drive output along the central axis of the tube mill. The gear unit comprises an input side power distribution stage and a take-off load-summing stage. The gear unit is mounted in a housing which is comprised of two housing parts 1, 2 whose interiors are spaced from one another. The housing part 1 comprises a horizontal parting line and receives therein the input side power distribution stage. The other housing part 2 receives therein the take-off load-summing stage. The interior space separation permits the implementation of differing concepts for the provision of lubrication to the components of the gear unit. Preferably, the oil lubrication is provided to the rapidly running parts of the power distribution stage in the housing part 1 by a closed circuit pressure lubrication that is not illustrated herein. With respect to the load stage which, as will be described in more detail hereinafter, is configured as a planetary stage, a simple immersion lubrication typically suffices in the housing part 2. The oil amount in the housing part 2, which housing part receives therein the planetary stage, can be regulated via the circulation of the closed-circuit pressure lubrication through the power distribution stage-receiving housing part 1. The housing part I serves at the same time as a torgue support for the housing part 2.

The driving input power rating is transmitted from a coupled electric motor, which is not illustrated herein, to the drive shaft 3. The drive shaft 3 is supported in the housing part 1 via bearings 4. A pinion 5 on the drive shaft 3 transmits the mechanical input power rating via a gear 6 to an axially freely adjustable intermediate shaft 7. Two oppositely disposed inclined tooth helical pinions 8 and 9 are mounted on the intermediate shaft 7. The incline angle is, in the event of a spur gear stage, of the same magnitude. Otherwise, the choice of the incline angle of one of the helical pinions 8, 9 is dependent upon the axial force resulting from the other similarly configured inclined helical components—namely, the gear 6 and the other respective one of the helical pinions 9, 8. The intermediate shaft 7, which is supported in an axially freely adjustable manner a manner by the bearings, automatically adjusts as a consequence of the respective settled-upon choice.

The intermediate shaft 7 is supported by bearings 10 in the housing part 1 that are configured as floating bearings. Preferably, the bearings 10 are roller bearings of the type comprising toroidal roller bearings. The deformations, in particular in the linear elastic range, of the loaded components must be taken into account with respect to the herein contemplated deployment of the gear unit as a central drive in the upper power rating range. In this event, the deflection of the intermediate shaft 7 is, in comparison to the other power distribution stages, relatively larger but, nonetheless, is still sufficiently small. Precisely because of these limitations and the requirement to achieve a space-saving compact configuration, the properties of the deliberately selected toroidal bearings prove their worth—that is, the loading capacity thereof in comparison to comparable cylinder roller bearings and the angle adjustability thereof in comparison to comparable self-aligning roller bearings. The attendant distribution of power renders superfluous the heretofore necessary effort in connection with known central drives to provide load compensation via additional coupling elements between the helical pinions 8, 9 along the branching.

The pinion 8 transmits one half of the drive output in a first branch, the pinion 9 transmits the other half of the drive output in a second branch of the take-off stage. In contrast to the known gear units, the take-off, which serves as the power output combination stage, is configured of a planetary stage which comprises two planetary gear units operated in parallel along the drive train. The mechanical output along the two branches is transmitted via additional gears, whereby the gears configured as components of a transmission chain in each branch are provided with the same characteristics such as, for example, the tooth number and modulus, at the respective comparable positions along the transmission chains. In connection with these components of the transmission chains, there is provided the bevel gear 5 mounted on the input shaft 3, the pinions 8, 9 on the intermediate shaft 7 as well as the gears 11, 25, which are described in more detail hereinafter, and the elements of both planetary gear units such as the sun gears 18, 32, the planetary gears 19, 33, and the hollow gears 24, 35. It is particularly to be noted that solely the thus-configured gear unit of a symmetrical planetary pear unit combination permits, via the variation in the choice of the tooth number in connection with an overall very compact configuration (i.e., small outer diameters of the planetary stages), the choice of a step-up or transmission ratio between the take-off rate of rotation and the input-side motor rate of rotation selected to accommodate the respective material to be milled.

A gear 11 meshingly engages the pinion 8 on the intermediate shaft 7 in the first branch of the gear unit. The gear 11 is mounted on a shaft 12 whose axis is, at the same time, co-axial with the central axis of the tube mill. The shaft 12 is supported via bearings 13 in the housing part 1. An inner coupling tooth set 14 is mounted in a cylindrical bore in the take-off rear surface of the shaft 12. A coupling shaft 15 having an outer tooth set at both ends thereof meshingly engages the coupling tooth set 14. Axial slide elements 16 can be mounted to provide axial support on the coupling shaft 15 to thereby limit the axial clearance thereof. The opposite end of the coupling shaft 15 terminates in a coupling half 17 of the sun gear 18 of the first planetary gear unit having an inner gear tooth set.

The sun gear 18 of the first planetary gear unit is in meshing engagement with the planetary gears 19 that are mounted on the planetary axles 21. The connection via the double-jointed pear coupling makes it possible for the sun gear 18, which is not further constrained by other components, to automatically freely adjust between a number of the planetary gears 19 to thereby provide self-actuating load compensation for the error-burdened gear teeth forces. An equal side polygon extends from the planetary axles 21 of the planetary gears 19. The planetary gears 19 of the first planetary gear unit are supported via bearings on the planetary axles 21 in a planet carrier 22. The planet carrier 22 is supported by bearings 23 in the housing part 2. The planetary gears 19, on the other hand, rotate in a non-slip manner relatively along a hollow gear 24 fixedly mounted to the housing.

A gear 25 meshingly engages the pinion 9 on the intermediate shaft 7 in the second branch of the gear unit. The gear 25 is mounted on a hollow shaft 26 whose axis, in turn, is co-axial with the central axis of the tube mill. The hollow shaft 26 is supported via bearings 27 in the housing part 1. A cylindrical opening of the hollow shaft 26 concentrically encircles, at the same time, the coupling shaft 15. A further inner coupling tooth set 28 of a second double-jointed gear coupling is mounted on the inner sleeve surface of the hollow shaft 26. Preferably, this coupling tooth set 28 is mounted in symmetrical relation to the tooth set of the gear 25. In this manner, it is possible to foreclose, in a simple manner, tilting moment possibilities. The hollow shaft 26 and the bearing 27, which extend through the wall between the housing parts 1, 2, function at the same time as separation elements between the interior spaces of the housing parts 1, 2. For example, an annular shoulder 29 narrows, at the rear side of the hollow shaft 26 facing the shaft 12, the cylindrical bore to an extent such that only the least possible amount of lubrication oil can cross over from the area of the immersion lubrication in the housing part 2 into the area of the closed circuit pressure lubrication in the housing part 1. As it is not possible to completely prevent this lubricating oil cross-over, the oil amount in the housing part 2 can be regulated via a non-illustrated oil condition monitoring along the circulation path of the closed-circuit pressure lubrication.

A coupling shaft 30 that is, likewise, configured as a hollow shaft, meshingly engages the inner coupling tooth set 28. Axial slide elements 31 can be mounted at the rear side of the coupling shaft to provide axial support. The coupling shaft 30 is provided on each respective end thereof with an outer coupling tooth set and an inner coupling tooth set. The take-off inner coupling tooth set encloses the coupling half of the sun gear 32 of the second planetary gear unit. The coupling shaft 15 extends through the second coupling shaft 30 and the sun gear 32.

The sun gear 32 of the second planetary gear unit meshingly engages with the planetary gears 33 which are mounted on the planetary axles 34. In a manner analogous to the first branch, the connection via the double-jointed near coupling makes it possible for the sun gear 32 to effect a load compensation via free floating movement thereof within the enclosing planetary gears 33 of the second planetary stage. The planetary gears 33 of the second planetary gear unit are supported via bearings 36 on the planetary axles 34 in the planet carrier 22. The planetary gears 33, on the other hand, rotate in a non-slip manner relatively along the second hollow gear 35 fixedly mounted to the housing.

An equal-sided polygon extends between the planetary axles 34 of the planetary gears 33. The polygons of the planetary axles 21 and 34 are offset relative to one another such that the planetary axles 21 of the first planetary unit lie exactly intermediate the planetary axles 34 of the second planetary gear unit. Preferably, three planetary gears 19 and 33 are rotatably supported in each of the two planetary gear units. Thus, the polygon exhibits the geometric configuration of an equal-sided triangle. As viewed along the central axis, the thus extended polygons of the planetary axles are offset from one another by an angle of 60°.

The gear unit shown in FIG. 1 is of a configuration in which the bearings are principally provided as roller bearings. The machine element roller bearings are subjected to wear due to the engaged contact between the roller bearing bodies and the running surfaces. In such a configuration, there always remains the possibility of a downtime condition of such bearings. In order to meet the requirements of an extreme security level against such downtown conditions, the gear unit can be provided, in lieu of roller bearings, with preferably technically equivalent plain journal bearings without having to deviate from the concept of the power output branching. The advantage of such machine elements is the non-moving property thereof and the therewith associated wear-or friction-free operation.

Figure 2:
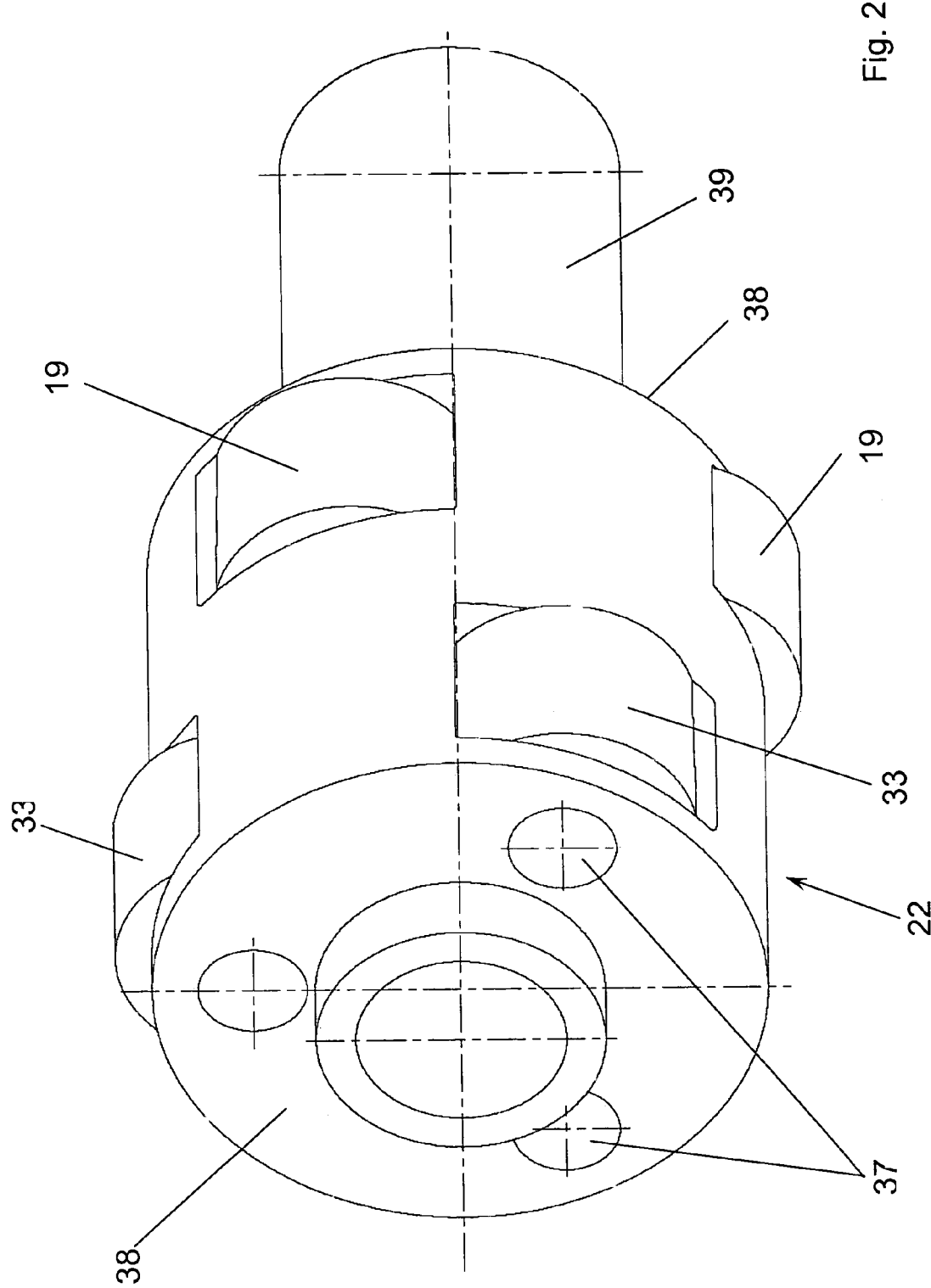
FIG. 2 shows in a perspective view a planet carrier for the gear unit shown in FIG. 1.
Figure 3:
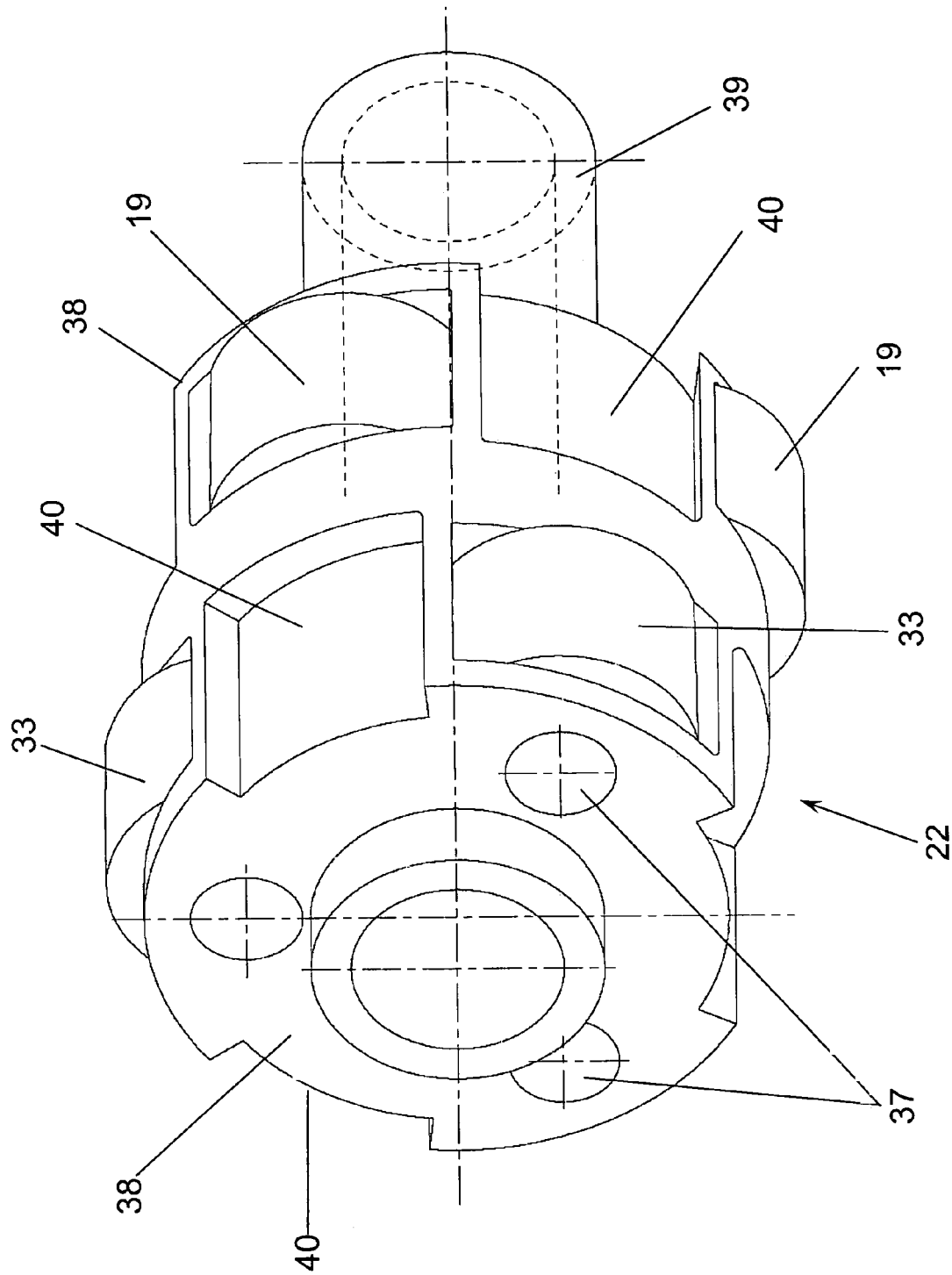
FIG. 3 shows in a perspective view another planet carrier for the gear unit shown in FIG. 1.

The planet carrier 22 that is shown in a perspective view thereof in FIGS. 2 and 3 is the same in both planetary gear units. The planet carrier 22 is produced as a single piece and is produced via casting and thereafter following machining.

The take-off shaft 39 is connected with the planet carrier 22 and is preferably configured as a solid shaft (FIG. 2) or as a hollow shaft (FIG. 3).

Bores 37 that are closed on one side (dead end bores) are provided at both rear sides 38 of the common, single piece planetary carriers 22. The bores 37 receive, on one side of the satellite carrier 22, the planetary axles 21 of the first planetary gear unit and, on other side of the planet carrier, the planetary axles 34 of the second planetary gear unit.

As a result of the afore-described arrangement and configuration of the bores 37 which receive the planetary axles 21, 34 and, in connection with the offset arrangement of the planetary gears 19, 33 in both planetary gear units, the planetary axles 21, 34 exhibit only a small length. The deflection of these short planetary axles 21, 34 is minimal so that high power outputs can be transferred. In contrast thereto, the planetary axles of other known multiple step planetary gear units deflect in an unreliable manner under the loads that occur. At the same time, due, especially, to the dimensions of the short planetary axles, there can be configured, via the planet carrier 22, a take-off drive having a smaller and more compact outer diameter. Via the arrangement of the planetary stages on separate planetary axles within the common planet carriers, the configuration can also be configured, as necessary, with two different planetary stages having differing teeth sizes.

The planet carrier 22 shown in FIG. 3 is a variation of the planetary carrier 22 shown in FIG. 2. The configuration of the planet carrier 22 shown in FIG. 3 takes into account, in particular, the technical demands of the original part production process-that is, the casting of such a component. Thus, in the area between the planetary axles 21, 34 on both sides of the planet carrier 22, edge recesses 40 are provided. These edge recesses 40 reduce the weight of the planet carrier 22 and, at the same time, minimize the risk of shrinkage of the material accumulation during the hardening of the cast part. The configuration of the take-off shaft 39 as a hollow shaft, likewise, follows this recommendation of a production-amenable construction and permits, at the same time, the possibility of a variety of configurations.

The specification incorporates by reference the disclosure of German priority document DE 103 24 362.3 filed May 27, 2003.

The present invention is, of course, in no way restricted to the specific disclosure of the specification and drawings, but also encompasses any modifications within the scope of the appended claims.

I claim:

1. A gear unit for the drive of a rotating tube, the rotating tube having a central axis, comprising:
   a drive shaft; and
   a power distribution gear stage including a helical gear unit with an intermediate shaft having two pinions mounted thereon and a load-summing gear stage with a take-off shaft co-axial with the central axis of the rotating tube, the intermediate shaft of the helical gear unit being supported axially freely adjustable on bearings, and the load-summing gear stage having a pair of parallel-operated planetary gear units, each planetary gear unit having a sun gear, a planetary gear mounted on a planetary axle for rotation therearound as the planetary gear meshingly engages an annulus gear, and the pair of planetary gear units being commonly mounted in a planet carrier configured as a single piece and connected with the take-off shaft of load-summing gear stage, the planetary axles of the pair of planetary gear units being separated from one another in the common planet carrier and offset relative to one another and the helical gear unit, and the planetary gear units together forming a symmetrical planetary gear unit combination.

2. A gear unit according to claim 1, wherein each planetary gear unit comprises three planetary gears which extend as polygons between the planetary axles in a geometric shape of an equal-sided triangle and an offset angle between the planetary axles of both planetary gear units is 60°.

3. A gear unit according to claim 1, wherein the intermediate shaft is supported on floating bearings, which are configured as toroidal roller bearings.

4. A gear unit according to claim 1, wherein the pinions mounted on the intermediate shaft are oppositely to inclined toothed.

5. A gear unit according to claim 1, wherein the gears and pinions on the same respective positions in the helical gear unit and the planetary gear units are arranged with the same teeth number and the total transmission ratio of the gear unit is adjustable by means of the selection of the tooth number of the gears with respect to process requirements.

6. A gear unit according to claim 1, wherein the take-off shaft that is connected with the planet carrier is configured as a hollow shaft.

7. A gear unit according to claim 1, and further comprising bearings which support the shafts, the planetary axles and the planet carrier are configured as a selected one of roller bearings and plain bearings.

8. A gear unit according to claim 1, wherein the planetary axles are arranged in bores closed on one side thereof, the bores being mounted on rear sides of the planet carrier.

9. A gear unit according to claim 8, wherein the planet carrier is configured as a cast part, which is provided with edge recesses in regions between the bores for the receipt of the planetary axles of the planetary gear units.

10. A gear unit according to claim 1, wherein the sun gear of each planetary gear unit is connected respectively via a double-jointed coupling to a branch of the helical gear unit.

11. A gear unit according to claim 10, wherein the coupling is configured having a hollow shaft which encircles another coupling shaft.

12. A gear unit according to claim 10, wherein the double-jointed coupling is arranged co-axially to the take-off shaft along the central axis of the rotating tube.

13. A gear unit according to claim 10, and further comprising axial slide elements disposed on rear sides of the double-jointed coupling.

14. A gear unit according to claim 1, wherein the helical gear unit, on the one hand, and the planetary gear units, on the other hand, are disposed in a respective separate housing part, the pair of separate housing parts together forming a housing.

15. A gear unit according to claim 14, wherein, in the housing part, the helical gear unit is mounted therein as a rapidly running stage, a closed-circuit pressure lubrication is provided and, in the housing part, the planetary gear units are mounted therein as slowly running stages, and an immersion lubrication is provided.

16. A gear unit according to claim 15, wherein an oil amount in the housing part, which receives the planetary gear units, is regulated via the circulation of the closed-circuit pressure lubrication in the housing part, which receives therein the helical gear unit.

17. A gear unit according to claim 15, wherein both housing parts comprise a common wall through which extends a coupling shaft, an encircling coupling shaft encircling the coupling shaft, the coupling shaft extends from the one housing part into the other housing part through an aperture in the common wall between the housing parts, and the gear unit includes a shaft having an annular shoulder for at least partially sealing off the migration of fluid through the aperture in the common wall between the housing parts, in order to reduce flow from an area of the immersion lubrication to an area of the closed circuit lubrication.

* * * * *